US006775014B2

(12) United States Patent
Foote et al.

(10) Patent No.: US 6,775,014 B2
(45) Date of Patent: Aug. 10, 2004

(54) SYSTEM AND METHOD FOR DETERMINING THE LOCATION OF A TARGET IN A ROOM OR SMALL AREA

(75) Inventors: Jonathan Foote, Menlo Park, CA (US); Don Kimber, Montara, CA (US)

(73) Assignees: Fujixerox Co., Ltd., Tokyo (JP); Xerox Corporation, Tokyo (JP)

( * ) Notice: Subject to any disclaimer, the term of this patent is extended or adjusted under 35 U.S.C. 154(b) by 204 days.

(21) Appl. No.: 09/764,837

(22) Filed: Jan. 17, 2001

(65) Prior Publication Data

US 2002/0093666 A1 Jul. 18, 2002

(51) Int. Cl.[7] .............................................. G01B 11/14
(52) U.S. Cl. ....................... 356/621; 356/622; 356/623; 348/140; 348/164; 348/169
(58) Field of Search ............................ 353/7, 8, 21, 28, 353/29, 42; 345/716, 719, 730; 356/615, 620, 621, 622, 623, 601, 602, 603, 606, 607, 608, 609; 348/131, 140, 164, 169

(56) References Cited

U.S. PATENT DOCUMENTS

| | | | | | |
|---|---|---|---|---|---|
| 4,468,694 | A | * | 8/1984 | Edgar .......................... | 348/135 |
| 5,023,709 | A | * | 6/1991 | Kita et al. ................... | 348/172 |
| 5,045,843 | A | | 9/1991 | Hansen ........................ | 340/709 |
| 5,239,373 | A | | 8/1993 | Tang et al. ................... | 358/93 |
| 5,383,013 | A | | 1/1995 | Cox .............................. | 356/2 |
| 5,434,617 | A | | 7/1995 | Bianchi ....................... | 348/170 |
| 5,465,144 | A | | 11/1995 | Parker et al. .......... | 356/139.06 |
| 5,572,251 | A | | 11/1996 | Ogawa ........................ | 348/207 |
| 6,339,748 | B1 | * | 1/2002 | Hiramatsu .................. | 702/159 |
| 6,341,016 | B1 | * | 1/2002 | Malione ..................... | 356/603 |
| 6,359,612 | B1 | * | 3/2002 | Peter et al. ................. | 345/156 |

OTHER PUBLICATIONS

Leibe et al.;The Perceptive Workbench: Towards Spontaneous and Natural Interaction in Semi–Immersive Virtual Environments; http://citeseer.nj.nec.com/265507.html; Mar. 2000; IEEE Virtual Reality Conference (as provided by the applicant).*

Shanon X. Ju, Michael J. Black, Scott Minneman, Don Kimber; *Analysis of Gesture and Action in Technical Talks for Video Indexing*; 1997 IEEE Computer Society Conference on Computer Vision and Pattern Recognition; San Juan, Puerto Rico; p. 595–601.

John C. Tang, Scott L. Minneman; *Videowhiteboard: Video Shadows to Support Remote Collaboration*; Association of Computing Machinery; 1991; p. 315–322.

Scott Elrod. Richard Bruce, Rich Gold, David Goldberg, Frank Halasz, William Janssen, David Lee, Kim McCall, Elin Pedersen, Ken Pier, John Tang and Brent Welch; *Liveboard: A Large Interactive Display Supporting Group Meetings, Presentations and Remote Collaboration*; Association for Computing Machinery; May 1992; p. 599–607.

(List continued on next page.)

*Primary Examiner*—Russell Adams
*Assistant Examiner*—Andrew Sever
(74) *Attorney, Agent, or Firm*—Fliesler Meyer LLP.

(57) ABSTRACT

A system is provided for locating a target, such as a person, relative to a projection screen, the system including two infrared light sources for casting separate shadows of the target on a translucent screen, such as those commonly used for back-projection displays. A sensitive video camera with an infrared filter over the lens that blocks all visible light is located behind the screen. This video camera captures a crisp silhouette for each of the shadows of the target. Image processing techniques detect the person's location as well as typical gestures, such as indicating or pointing to an area of the screen. This allows natural interaction with the display, for example, controlling a pointer or cursor on the screen by pointing at the desired area.

12 Claims, 3 Drawing Sheets

OTHER PUBLICATIONS

Bastian, Leibe , Thad Starner, William Ribarsky, Zachary Wartell, David Krum, Brad Singletary and Larry Hodges; *The Perceptive Workbench: Towards Spontaneous and Natural Interaction in Semi–Immersive Virtual Environments*; http://citeseer.nj.nec.com/265507.html, IEEE Virtual Reality Conference, New Brunswick, N.J.; Mar. 2000.

Darrell, T.; Gordon, G.; Harville, M. and Woodfill, J., "Integrated Person Tracking Using Stereo, Color, and Pattern Detection," *IEEE*, 1998, 10 pp.

Moran, T.P.; Saund, E.; van Melle, W.; Gujar, A.U.; Fishkin, K.P. and Harrison, B.L., "Design and Technology for Collaborage: Collaborative Collages of Information on Physical Walls," *CHI Letters*, vol. 1, No. 1, *UIST '99*, Ashville, North Carolina, 1999, pp. 197–206.

Pavlović, V.; Sharma, R. and Huang, T.S., "Visual Interpretation of Hand Gestures for Human–Computer Interaction: A Review," *IEEE Transactions on Pattern Analysis and Machine Intelligence*, vol. 19, No. 7, Jul. 1997, pp. 677–695.

Saund, E., "Image Mosaicing and a Diagrammatic User Interface for an Office Whiteboard Scanner," working paper, Xerox PARC, http://www.parc.xerox.com/spl/members/saund/papers.html.

Starner, T. and Pentland, A., Real–Time American Sign Language Recognition from Video Using Hidden Markov Models,⇋ *M.I.T. Media Laboratory Perceptual Computing Section Technical Report No. 376*, 7 pp.

Strickton, J. and Paradiso, J., "Tracking Hands Above Large Interactive Surfaces with a Low–Cost Scanning Laser Rangefinder," in *ACM CHI'98 Conference*, Los Angeles, California, Apr. 21–23, 1998; ACM Press, New York, Apr. 1998, pp. 231–232.

Wren, C.R.; Azarbayejani, A.; Darrell, T. and Pentland, A.P., "Pfinder: Real–Time Tracking of the Human Body," *IEEE Transactions on Pattern Analysis and Machine Intelligence*, vol. 19, No. 7, Jul. 1997, pp. 780–785.

* cited by examiner

SYSTEM AND METHOD FOR DETERMINING THE LOCATION OF A TARGET IN A ROOM OR SMALL AREA

DEFINITION OF TERMS

As used in the context of discussing the present invention and prior art which relates to the present invention, the term "target" refers to either an object or a person (as those terms are defined immediately below), or any portion of an object or a person. The term "object" refers to an inanimate object. The term "person" refers to a human being.

BACKGROUND OF THE INVENTION

1. Field of the Invention

The present invention relates generally to target tracking and gesture recognition. In particular, the present invention relates to a system and method for determining the location of a target relative to a projection screen in a room or small area for the purpose of altering images projected onto the projection screen, such as providing a pointer or highlighted area as controlled by the location of the target.

2. Description of the Related Art

One approach for determining the location of a target involves stereoscopic images, which are three-dimensional images based on two slightly different two-dimensional images. For example, U.S. Pat. No. 5,383,013, issued to Cox (hereinafter, "Cox"), discloses a method where corresponding features in the left and right images of a stereoscopic view of a scene are determined. The disparity between the corresponding object in the scene in the left and right images is first determined. The disparity is used along with the known separation distance of the pair of cameras to provide a measurement of the distance of the target from the pair of cameras. One disadvantage of the approach disclosed in Cox is that two cameras must be used, which adds significantly to the cost and complexity of the system. In particular, Cox is computationally intensive as image features must be cross-correlated in order to determine disparity.

Another approach for determining the location of a person is disclosed in U.S. Pat. No. 5,465,144, issued to Parker et al (hereinafter, "Parker"). Parker discloses a method for tracking a person with a camera. The person wears an infrared beacon, and the infrared beacon is tracked. In addition to the drawback of requiring the person to wear an active device, this system will have problems when the person is not facing the camera.

Another approach for determining the location of an target is presented in Leibe et al., "The Perceptive Workbench: Towards Spontaneous and Natural Interaction in Semi-Immersive Virtual Environments," December, 2000, found at (hereinafter "Leibe"). Leibe discloses a system where multiple near-infrared light sources are arranged below a desk. A camera with a filter that blocks out all visible light is also located below the desk. The underside of the desk is illuminated by the near-infrared light sources. Everything close to the desk surface reflects this light and can be seen by the camera under the display surface. Using a combination of intensity thresholding and background-subtraction, interesting regions of the camera image are extracted and analyzed. One disadvantage of the approach disclosed in Leibe is that only the location of targets that are close to the desk surface can be determined.

Leibe also discloses a system and method for determining the location of part of a person's arm. Light sources are arranged above the desk, illuminating the desk surface. The camera with the infrared filter is still located beneath the desk. A person stands in front of the desk and moves her/his arm over the desk, casting a shadow on the desk surface. The camera sees all the near-infrared light from the light sources, except the region that is blocked by the person's arm. Leibe then uses intensity thresholding and background subtraction to distinguish the person's arm from the background in the images recorded by the camera. One disadvantage of the approach disclosed in Leibe is that it is assumed that the arm's shadow always touches the image border. Hence, the middle of the area where the arm's shadow touches the image border is treated as an approximation for the origin of the arm, and the point that is farthest away from the shoulder is treated as the fingertip. Leibe is limited to the situation where only part of a person's arm needs to be tracked.

SUMMARY OF THE INVENTION

In accordance with the present invention, a robust system and method for determining the location of a target in a room or small area using inexpensive infrared technology is provided. In the system two light sources are arranged to illuminate a projection surface. A target is located between the light sources and the projection surface. The light sources shining on the target cast shadows on the projection surface, one shadow for each light source. An imaging device placed behind the projection surface detects the shadows.

In one embodiment of the present invention, the light sources are infrared light sources, and the imaging device is sensitive to infrared light, but impervious to visible light. The light sources in one embodiment are distinguished from one another by illuminating the projection surface during alternate frames. Frequency maybe adjusted so that illumination may occur during more than one frame for each source. Alternatively, the sources may be distinguished by intensity or polarization, rather than alternately turning them on.

The target's location can be inferred from the size and the location of the different shadows caused by the individual light sources. One example of determining the target's location is determining the distance that the target is located away from the projection surface. Another example of determining the target's location is determining the target's height. Where the target is a person, another example of determining the target's location is determining the center of the head of the person or the location of the person's extremities, such as the distance that the person's fingertip from the screen.

The location of the target can be used to alter what appears on the projection surface. For example, a persons finger location can be used to move a cursor or pointer, or indicate an area which should be highlighted. A person's finger distance from the screen might be used to cause a function similar to a mouse button click.

BRIEF DESCRIPTION OF THE DRAWINGS

Further details of the present invention are explained with the help of the attached drawings in which.

DETAILED DESCRIPTION

A. System Overview

Figure 1:
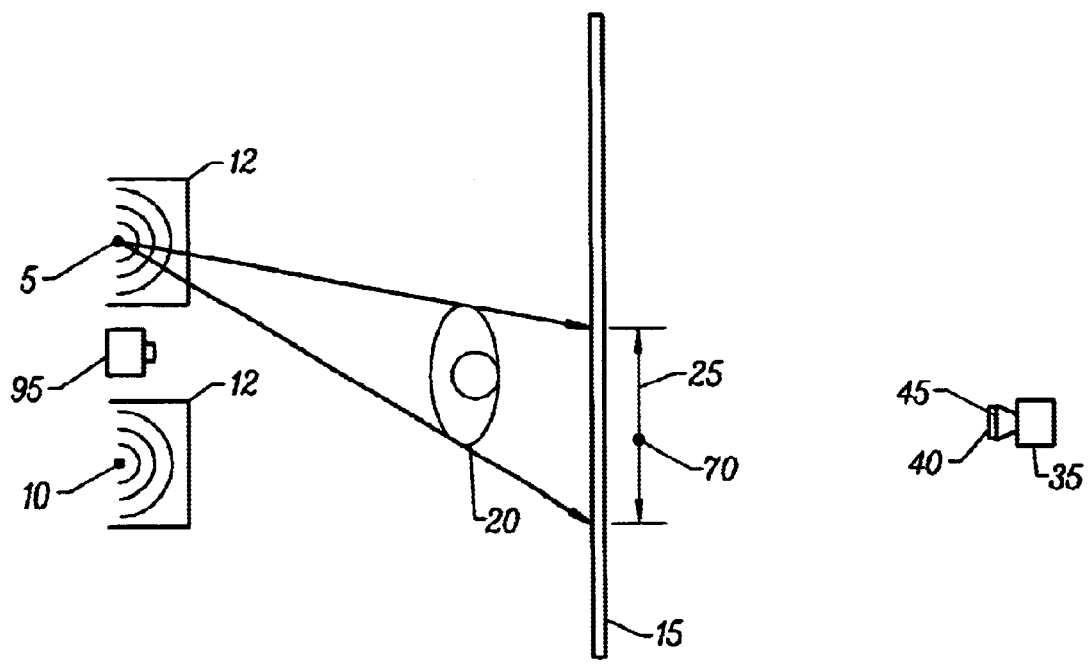
FIGS. 1–3 and 5 show a top view of a system in accordance with the present invention.
Figure 2:
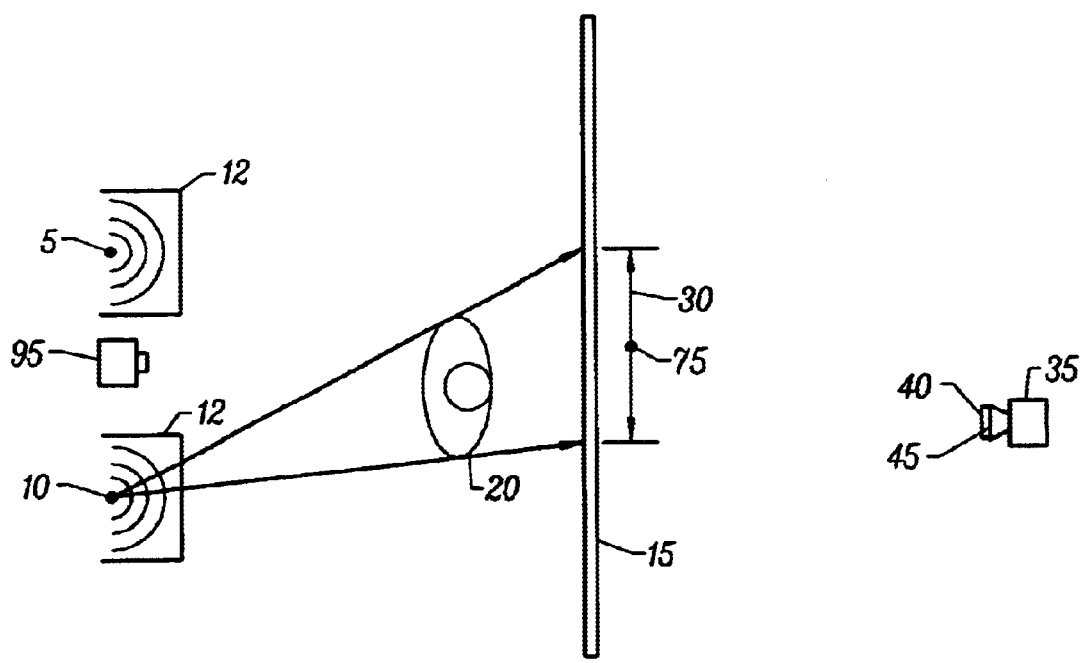
Figure 3:
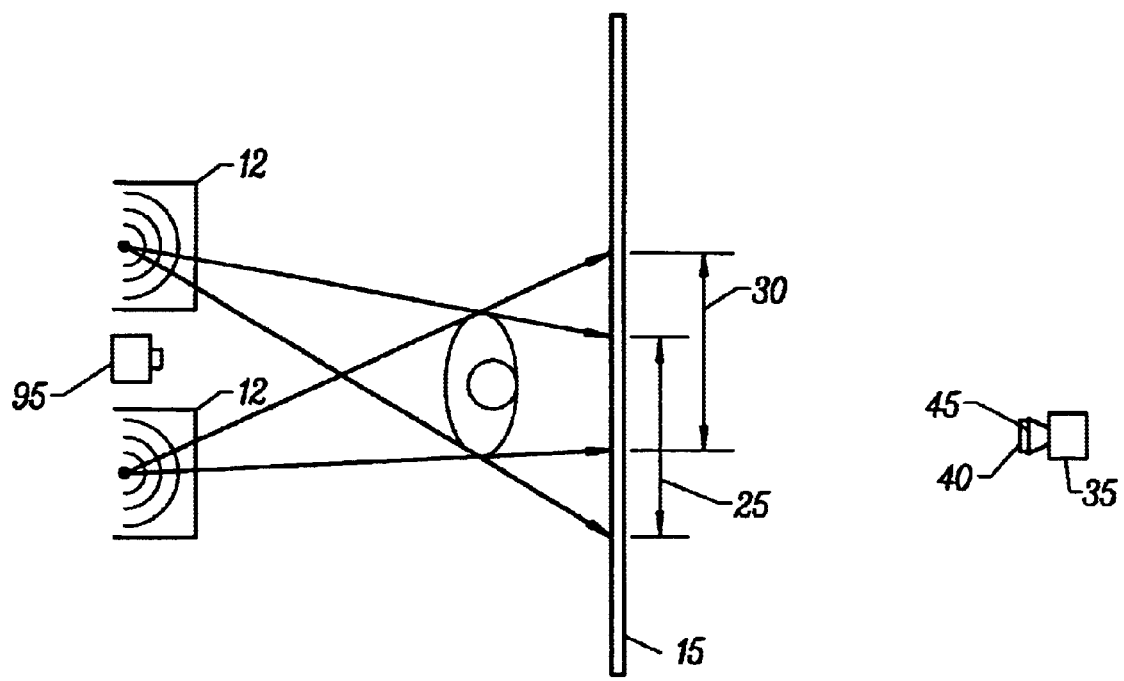

FIGS. 1–3 show a top view of a system in accordance with the present invention. In the system, inexpensive infrared technology is used to robustly detect the location of a target in a room or small area. The system includes two infrared light sources 5 and 10, separated by a baseline distance and arranged to illuminate a translucent screen 15. A target 20 is located between the sources 5 and 10 and screen 15. In the embodiment of the invention shown in FIGS. 1–3, the target 20 is a person. A display 95 (for example, the display of a computer) is projected onto the screen 15. The person 20 can interact with the display 95 while, for example, making a presentation to an audience.

The light sources 5 and 10 shining on the person 20 will cast two different shadows on the screen 15. The shadow 25 cast by light source 5 is shown in FIG. 1. The shadow 30 cast by light source 10 is shown in FIG. 2. Both shadows 25 and 30 are shown in FIG. 3. A video camera 35 placed behind the screen 15 images the shadows. The video camera 35 is sensitive to infrared light, but is impervious to visible light. This is accomplished, for example, by placing a filter 40 for blocking visible light on the lens 45 of the video camera 35. Other kinds of imaging devices are also suitable for use in accordance with the present invention. In FIGS. 1–3, the person 20 is standing in front of a translucent screen 15, and is illuminated by light sources 5 and 10. Other types of projection surfaces can be used in accordance with the present invention.

The sources 5 and 10 can be placed on the ceiling so that only targets near the screen cast shadows on the screen. The shadows from each source will be offset by an amount that is related to the object's distance from the screen. The displacements can be used to find the object's distance from the screen using simple trigonometric considerations. If the target is a person, his or her location is useful for a number of applications, including conversational character interfaces, immersive audio, automatic camera control and virtual reality.

B. Distinguishing Light Sources

Where a plurality of light sources are used in accordance with the present invention, the light sources must be distinguished from one another so that the step of determining the target's location can be performed. The light sources 5 and 10 can be distinguished by frequency, intensity, polarization, or other means.

One method is to distinguish the light sources 5 and 10 by frequency. This means that only one light source illuminates screen 15 at any given time. The light sources 5 and 10 are alternately illuminated at a particular rate, which will hereinafter be called the "switching rate." This switching rate is synchronized with the video frame rate, so that each source illuminates alternate video frames. Many video capture cards have synchronization outputs that can be used for this purpose.

Alternatively, the light sources 10 and 15 can be switched at a rate that is slower than the video frame rate, so that several successive frames are illuminated by each source. The pixel differences between successive frames will be detectably larger when the light source changes. From this, the system can estimate a change frequency and periodically correct it as in a phase locked loop. This approach trades software complexity for the advantage of not having to synchronize the sources in hardware. Another approach is to use polarizing filters 12 on the light sources so that the light sources do not have to be alternately illuminated and to use LCD shutters or other methods of variable polarization to analyze the image.

C. Imaging the Projection Surface

Referring to FIGS. 1–3, a video camera 35 is placed behind the screen 15 for the purpose of imaging. This video camera captures what appears on the side of the screen 15 opposite the person 20 as a series of images. The video camera 35 in one embodiment is sensitive to infrared light and impervious to visible light. While a video camera is used in the preferred embodiment, any number of imaging devices could be used in accordance with the present invention.

In a further embodiment of this system, the mapping function between camera image and screen shadow coordinates can be found automatically without use of infrared sources. This is done by removing any infrared filter from the video camera 35 and using the sources 5 and 10 to illuminate in the visible range. The camera 35 then views the displayed shadow images from the backscatter on the screen 15.

To determine what screen coordinates map to camera coordinates, a calibration image is projected on the screen 15. For example, a single dot can be placed on the camera image, and its coordinates can be detected. In practice, many points can be calibrated at once if a regular image, such as a grid, is used. The grid can be swept such that all pixels are mapped, or else intermediate pixels can be determined by interpolation. The result is a 2-dimensional lookup table that maps camera image coordinates to absolute screen coordinates, and will compensate for lens distortions or any other aberrations such as the unavoidable offset of the video camera 35 from the axis of projection.

D. Segmenting the Target Boundaries in the Images

Figure 4A:
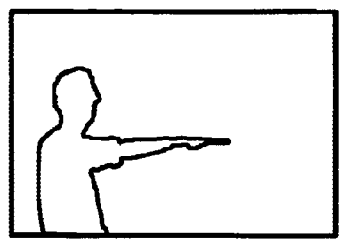
FIG. 4A shows a shadow image as recorded by a video camera with a filter over the lens that blocks all visible light.
Figure 4B:
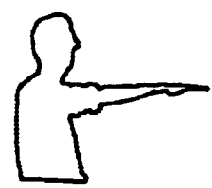
FIG. 4B shows the shadow image in FIG. 4A, after the step of thresholding.

One or more targets can be identified in the screen image by thresholding such that all silhouette pixels are zero and all other pixels are one. FIG. 4A shows a shadow image as recorded by a video camera with a filter 40 over the lens 45 that blocks all visible light. The image is then thresholded, meaning that all silhouette pixels are assigned a value of zero and all illuminated pixels are assigned a value of one. FIG. 4B shows the shadow image in FIG. 4A, after the step of thresholding. Each image in the series of images recorded by camera 25 is thresholded. Although segmenting the target boundaries in the images is accomplished in the preferred embodiment by thresholding the images, any number of techniques could also be used in accordance with the present invention.

E. Determining the Target's Location

The location of person 20 can be inferred from the size and the location of the shadows 25 and 30. Referring to FIGS. 1–3, one example of determining the target's location is determining the distance that the person 20 is located away from the screen 15. This is done by determining the location disparity between corresponding points on the two shadows, because the shadows from each source will be offset by an amount that is related to the person's distance from the screen. For example, the first spatial moment of a shadow corresponds to the center of mass, or centroid, of the target casting the shadow. In FIG. 1 the centroid of the person 20 in shadow 25 is located approximately at point 70. Similarly, in FIG. 2 the centroid of the person 20 in shadow 25 is located approximately at point 75. The displacement between points 70 and 75 gives a good estimate of the disparity, and the target's distance between the centroids is a good estimate of the average disparity. Straightforward heuristics can then be used to estimate the user's location.

In many cases, a one dimensional estimate is all that is required to determine a target's location. Projecting the silhouette image on the X-axis and finding the mean or first central moment gives an excellent measure of the person's X-position. Often this will be accurate enough that the disparity can be estimated by subtracting the X coordinates of the two disparate images.

Another example of determining the target's location is determining the height of the person 20. This is done by median-filtering the maximum Y-extent of the shadow caused by a particular light source over a time interval. This yields a robust estimate of the height of the person 20 because the head is typically the high point since it is not comfortable to reach over the head for an extended period of time. A median filter will remove transient events where extremities might be higher than the head, such as pointing at a high location. Subtracting a few inches from the height gives a reasonable estimate of the center of the head. The estimate can be refined by examining the image in the immediate vicinity, and detecting shape features such as an ovoid head shape or the convexity of the neck.

To find extremities such as an outstretched arm or hand, simple heuristics again suffice. Examining the shadow boundary points of maximum distance from the shadow centroid will identify extremities, such as the outstretched arm or the hand. Maximally extremity points more than a certain distance from the centroid will identify the locations of a pointing fingertip or pointing device held in a user's hand. The location and trajectory of a fingertip over time can be used to control a pointing device, or zoom a camera in on the indicated region.

Figure 5:
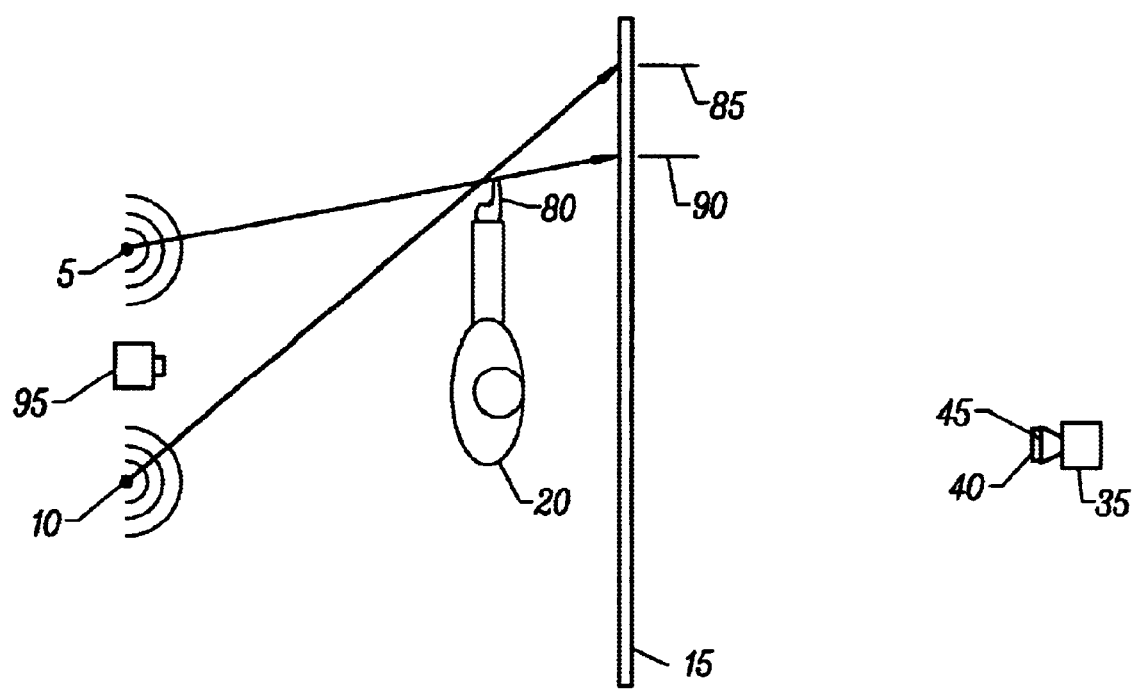

With identification of extremum, the distance from the extremities can further be determined. For example, referring to FIG. 5, the distance of the outstretched hand 80 from the screen 15 can be determined. This is accomplished by determining the disparity between (i) the point in the shadow cast by light source 5 that corresponds to the outstretched hand 80 (this is point 90 in FIG. 5) and (ii) the point in the shadow cast by light source 10 that corresponds to the outstretched hand 80 (this is point 85 in FIG. 5).

Additional heuristics can be used to discriminate between different gestures made using extremum. For example, matching hand-like or finger-like templates can be done to discriminate a waving hand from a pointing finger. Also by detecting displacement of the hand from a centroid or head, waving can be distinguished from pointing. Motion characteristics which can be determined using data from multiple frames are also helpful to distinguish gestures. Extremities can be assumed to move more slowly than some maximum reasonable speed.

While most of these methods could be used to track people in conventional video images, they will be more robust when used with the present invention system which distinguishes shadows, as opposed to a system which tries to directly separate content from video This is because reliably segmenting object boundaries in a video image is generally an unsolved problem. Non-object motion, ambiguous color or texture, or changing background imagery will confuse most person tracking systems. But, these problems are avoided completely using the method and system in accordance with the present invention.

F. Using Extremum To Control What Appears on the Projection Surface

Once the location of the user's hand has been detected, mapping from the image coordinates to the display screen coordinates gives the screen position of the extremity. Once the location of the hand or fingers is determined relative to the image, the user can be given control of a cursor or screen pointer as if using a large touch screen. As an example, pointing at or indicating a desired location on the screen 15 could be set to control movement of the cursor on the display of the computer 95 to the desired location.

In one embodiment, when a person's hand is close enough to the screen 15, the equivalent of a mouse "button down" command could be issued to the computer 95, perhaps in concert with audible feedback to the person. When the hand is far enough away from the screen 15 that the disparity is significant, then an averaging is used to determine the hand location, perhaps weighted to account for asymmetrical placement of the sources 5 and 10. When a user's hand is close enough to the screen (measured by disparity), say several centimeters, the mouse "button down" command is then issued to the computer. This could be very useful in a long-distance presentation. For example, in a teleconference, the indicated locations on the projected image could be highlighted with a moving cursor at a remote site, without having to send the video information.

In other embodiments, different hand shapes can be detected and used for different operations. For example a fist might mean "grab a graphic object" while a pointing finger might mean "draw a graphic object." More than one extremity can be detected, allowing a rich set of gestural interfaces. For example, two outstretched hands could rotate a 3-dimensional view by moving one hand closer to the screen while the other hand moves farther away. In this fashion, the user can control and interact with real or virtual objects displayed on the screen.

Gesture recognition such as pointing and non-pointing combined with distance from the screen determination forms the basis for a robust gesture recognition system. Areas indicated by gesture during a presentation can further serve as a valuable additional information source. For example, in a teleconference, the indicated locations on the projected image can be highlighted with a moving cursor at a remote site, without having to send all the video information. This information could also be recorded, used as an additional indexing information source, or a zoomed version displayed to the audience. Text or graphics that have been pointed to by the presenter can be highlighted in a summary, or extracted to serve as an index.

The system in accordance with the present invention replaces a touch screen interface, with the drawback that the user can not "touch" regions already occluded by the user's head or torso. This is not a burden on the user, since presenters will usually indicate only regions that the audience (and hence the IR camera) can see. Additionally, touch screens rarely allow more than one point of contact, and cannot estimate distance or gesture.

In other embodiments of the present invention, more sophisticated analyses such as template matching or hidden Markov models are allowed to be used for general gesture recognition and user interaction. Recognizing gesture and body stance is an important part of interfaces using avatars or embodied characters. For example, knowing the user's head location allows the character's eyes to meet the user. Three dimensional immersive audio requires the location of the user's head in order to generate the appropriate acoustic signals to give the sensation of surrounding sound. Three-dimensional video environments and virtual reality also make compelling use of location information. Depending on the users position, different views of a virtual or real scene can be displayed on the projection screen, allowing a user to walk around and see the view change as if the screen were a transparent window.

A further embodiment of the present invention simplifies "color keying," that is, replacing a portion of one video image with another. Color keying is the technique used to superimpose the image of a weather-caster on a computer image. Traditionally color keying is done by videographing the subject against a background of uniform distinctive color, and pixels of the uniform background color are then replaced with the background image. Besides typically restricting the colors that the subject can wear, the subject must typically interact with images they cannot see. The present invention embodiment simplifies things for a subject considerably since if the IR source is located close to the camera and the shadow seen corresponds to exactly the region the person is covering on the screen.

Although the present invention has been described above with particularity, this was merely to teach one of ordinary skill in the art how to make and use the invention. Many additional modifications will fall within the scope of the invention. Thus, the scope of the invention is defined by the claims which immediately follow.

What is claimed is:

1. A method for determining the location of a target, comprising the steps of:

using a plurality of light sources to illuminate the target in front of a translucent screen, so that each light source, when illuminated, causes the target to cast one shadow on the translucent screen;

using a video camera that is sensitive to infrared light but impervious to visible light to record a shadow of the target caused by each of the light sources appearing on the side of the translucent screen opposite the target as a series of images, each image comprising a plurality of pixels;

assigning all pixels in the images that represent a shadow a certain value, and assigning all pixels in the images that represent anything other than a shadow a different value;

determining the target's location from the size and location of the shadows; and wherein the light emitted by one of the plurality of light sources is polarized differently than the light emitted by another one of the plurality of light sources.

2. The method of claim 1, wherein only one of the one or more light sources provides light at any given time.

3. The method of claim 2, wherein:

the light sources are alternately illuminated at a particular switching rate, such that only one of the plurality of light sources is illuminated at any given time; and the images are recorded at a particular frame rate.

4. The method of claim 3, wherein the switching rate is synchronized with the frame rate.

5. The method of claim 3, wherein the light sources are infrared light sources.

6. The method of claim 5, wherein the imaging device is a video camera that is sensitive to infrared light but impervious to visible light.

7. The method of claim 1, wherein the intensity of light emitted by one of the plurality of light sources is different than the intensity of light emitted by another one of the plurality of light sources.

8. The method of claim 1, wherein the step of determining the target's location involves determining the distance between the target and the translucent screen.

9. The method of claim 1, wherein the target is a portion of a person's body, and wherein the step of determining the person's location involves determining the location of a top of the person's head.

10. The method of claim 1, wherein the target is a portion of a person's body, and wherein step of determining the person's location involves determining the location of one or more of the person's extremities.

11. The method of claim 10, wherein the step of determining the person's location involves determining the distance between one or more of the person's extremities and the translucent screen.

12. The method of claim 10, further comprising the steps of:

using the person's location to alter what appears on the translucent screen.

* * * * *